United States Patent Office 3,098,722
Patented July 23, 1963

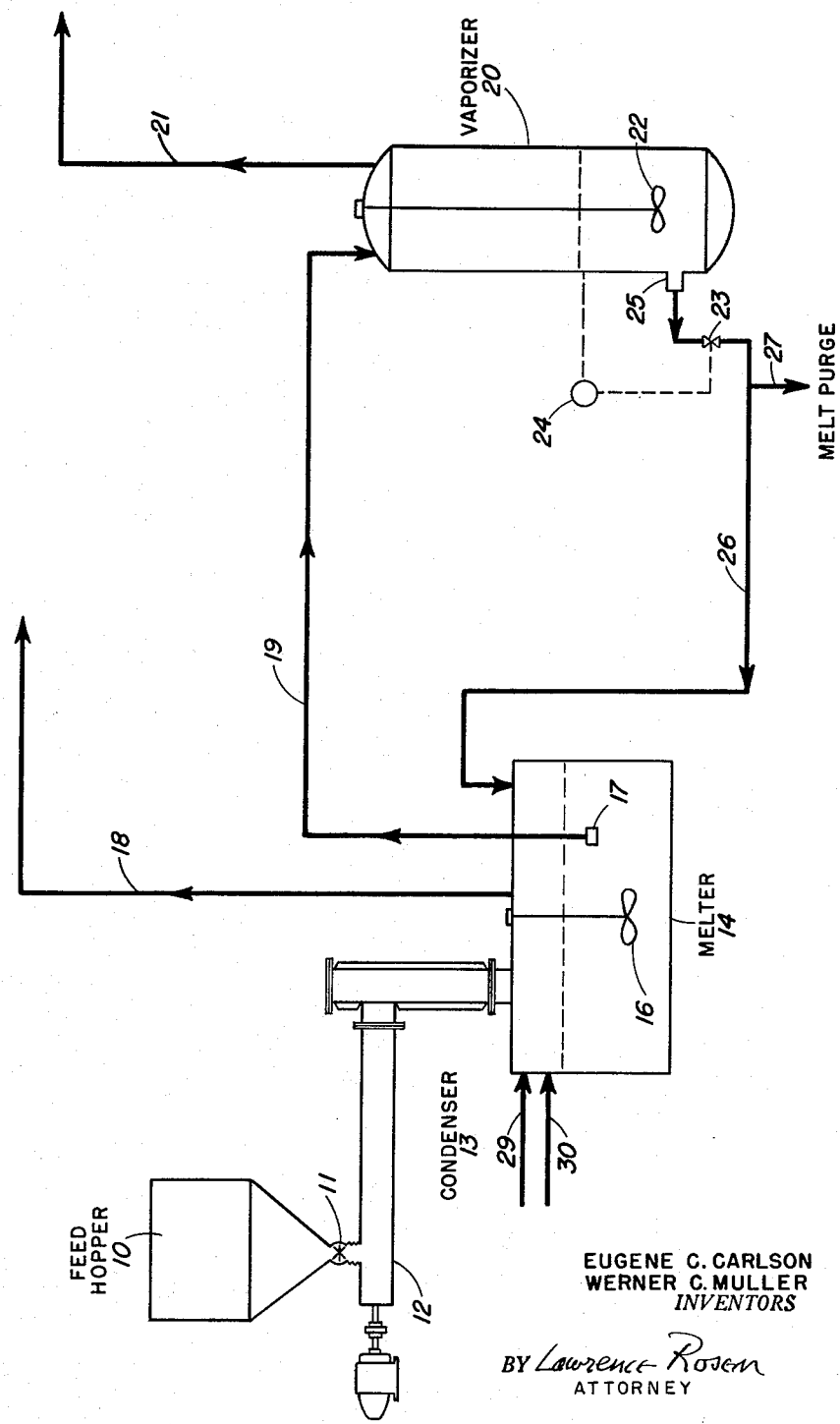

3,098,722
PURIFICATION OF METAL HALIDES
Eugene C. Carlson, Baytown, Tex., and Werner C. Muller, Roslyn, N.Y., assignors to National Distillers and Chemical Corporation, New York, N.Y., a corporation of Virginia
Filed Jan. 16, 1959, Ser. No. 787,282
9 Claims. (Cl. 23—294)

This invention relates to a process for the purification of zirconium and hafnium halides and, more particularly, to a novel continuous method for the purification of the tetrahalides of these metals.

Recently there have been increased demands for zirconium halides substantially free of contaminants. In the preparation of high-grade zirconium metal, for example, processes have been proposed which involve the reduction of zirconium tetrahalides with known reducing agents such as magnesium and sodium. In these processes, it is essential that the zirconium tetrahalides being reduced have a minimum contamination of certain metal halides, such as iron halide, aluminum halide, and the like. It is also important to remove gaseous impurities which may be adsorbed on the zirconium tetrahalide in order to avoid the production of a metal product having an undesirable hardness value. Crude zirconium tetrahalides have been purified previously by sublimation in the presence of a reducing agent such as gaseous hydrogen. This method of purification has not proved commercially satisfactory because the desired degree of purification is not achieved and because there are many operational hazards involved. An improved process has been proposed recently which involves distilling or volatilizing purified zirconium halide from a fused mixture containing the impure zirconium halide and at least one alkali metal halide. This method is discussed in articles by Horrigan, "Journal of Metals," pages 1118–1120 (October 1955), and by Howell et al., "Journal of Metals," pages 193–200 (January 1957). The recovery of pure zirconium chloride by distillation from a molten salt bath containing one or more alkali metal chlorides, preferably a mixture of sodium and potassium chlorides, is disclosed in U.S. Patent No. 2,443,253 to Kroll et al. A similar method is taught by Eaton in U.S. Patent No. 2,744,060, wherein zirconium halides dissolved in an alkali metal chloride melt or in a low-melting mixture of sodium chloride and potassium chloride are distilled out and collected as separate, purified products.

Difficulties have arisen in adapting the above processes for commercial operation. It has been found, for example, that the color of the zirconium tetrahalide product recovered by distillation began to change after a relatively short period of operation from snow white, indicating high purity, to faint yellow, due to the volatilization of certain metal halide impurities, particularly ferric chloride, from the fused salt mixture. This relatively early depletion of the purification capacity of the fused salt mixture also makes continuous operation difficult. Although the exact cause of this loss of effectiveness is not clearly understood, it is believed that the concentration of the metal impurities builds up rapidly in the fused salt to a level where solubility or complex formation, which maintains the impurities as less volatile materials, no longer serves to retain the impurities in the molten mixture. As a consequence, it is necessary to remove the contaminated fused melt and to replace it with a fresh mixture. Serious corrosion problems have also been encountered, possibly as a result of the presence of adsorbed chlorine gas on the crude zirconium tetrahalide feed. Furthermore, the zirconium metal product was found to have a very high hardness value, which appeared to result from the presence of oxygen and oxygen-containing compounds in the purified zirconium tetrahalide.

It is one object of this invention to overcome the above disadvantages of the fused salt mixture method for the purification of zirconium and hafnium halides. It is a further object of this invention to provide an efficient, inexpensive and continuous purification process for zirconium and hafnium tetrahalides. Additional objects will become apparent from the ensuing description of the invention; which, for purposes of simplification, is directed mainly to the purification of zirconium tetrahalides.

In accordance with the present invention, a continuous method has been discovered for the production of substantially pure zirconium halides in high yields; which, in general, comprises adding zirconium tetrahalide and finely divided zirconium metal continuously to a salt melt system consisting of two alkali metal halides with which the zirconium tetrahalide forms a molten mixture; continuously circulating this molten mixture between a melting zone in which it is formed and from which low boiling impurities are volatilized and a vaporizing zone in which purified zirconium tetrahalide is sublimed or distilled from the melt; and condensing the evolved purified zirconium tetrahalide.

In the accompanying schematic flow diagram, which forms part of the specification and should be read in conjunction therewith, one commercial embodiment of the invention is illustrated. The numeral 10 designates a feed hopper from which the crude zirconium tetrahalide is fed via a variable speed rotary star feeder valve 11, a variable speed screw conveyor 12, and a small scraped wall feed condenser 13 to a melter 14. Melter 14 is equipped with a propeller agitator 16 and a variable speed submerged centrifugal pump 17. Finely divided zirconium metal, via line 30, and sodium halide and potassium halide, via line 29, are fed to melter 14. Line 18 conveys gaseous impurities and a minor amount of vaporized zirconium tetrahalide from melter 14 to a condenser. Line 19 conveys the molten mixture of zirconium tetrahalides and alkali metal halides to the vaporizer 20. Line 21 removes purified zirconium tetrahalide vapor from vaporizer 20 which is equipped with an agitator 22, a level control valve 23, and a level indicating unit 24. Depleted melt leaves vaporizer 20 through a discharge nozzle 25 and is recycled to melter 14 through line 26.

Referring to the drawing, more specifically, zirconium tetrahalide under an inert atmosphere, such as argon, is fed from feed hopper 10 to melter 14 through variable speed rotary star feeder valve 11, variable speed screw conveyor 12, and a small scraped wall type feed condenser 13. The scraped wall condenser is used to condense zirconium tetrahalide vapors rising from the melt into the feed system by offering a sharp thermal gradient at the melter-condenser junction where solid zirconium tetrachloride tends to accumulate. Revolving chains may be employed within the condenser to continually break up condensed zirconium tetrahalide from the vessel walls and allow it to fall back into melter 14. Finely divided zirconium metal through line 30 and sodium halide and potassium halide through line 29 are also fed to the melter, and these halides along with the zirconium tetrahalide form the molten mixture. Melter 14 is jacketed or equipped with immersion heaters (not shown), a propeller agitator 16, and a variable speed submerged centrifugal pump 17. The temperature of the melter is held at about 550° to 650° F., preferably about 600° to 625° F., to drive off through line 18 gaseous impurities which might be dissolved or partially entrapped in the melt. The melt, minus these volatile impurities, is then pumped through line 19 to the vaporizer 20, which is maintained at a pressure of about 1 to 15 p.s.i.g. The temperature of the melt in vaporizer 20 ranges from about 650° to 850° F., preferably about 700° to 800° F., depending upon the melt composition, operating pressure and the rate at which purified zirconium tetrachloride vapor is removed through line 21. The body of melt in the vaporizer is kept in constant motion by means of an agitator 22, this agitation being required to maintain a uniform melt by preventing the formation of sludgy melt on the walls of the vessel where most of the vaporization occurs and by holding the insoluble materials in suspension. Purified zirconium tetrachloride is sublimed from the melt and removed through line 21; the depleted melt is continuously carried from vaporizer 20 back to melter 14 through line 26, the return flow being controlled by a level control valve 23 which is operated by a level indicating unit 24 in the vaporizer. The extent of the impurity build-up in the melt system is controlled by purging sufficient melt through line 27 to maintain less than about a 17 weight percent water insoluble content. The purified zirconium tetrachloride evolved by the above-described process may then be condensed and recovered. In this manner a high yield of zirconium halide having a markedly lower metal impurity content than the crude feed material can be obtained continuously.

Since an excessively high level of melt in the vaporizer can result in non-volatile sodium chloride and potassium chloride being carried into the vapor flow line to the condenser, thus causing partial plugging of the vapor flow control valve and flow orifice, and since an excessively low level of melt in the vaporizer can result in more rapid changes in vaporizer melt composition and rapid changes in the vapor pressure of the melt and loss of heat transfer surface area, the level of melt in the vaporizer is kept at a predetermined height. When the level of melt rises above this height, the flow control valve opens up to allow greater flow rate of the melt from the vaporizer to the melter; when the level of the melt falls below this predetermined height, the flow control valve closes up to restrict the return flow to the melter.

It has been found that if a small amount of finely divided zirconium or hafnium metal is present during the purification procedure the serious corrosion problem is avoided and substantially pure zirconium tetrahalide may be recovered from the salt melt by vaporization. For example, the addition of zirconium fines has been found to remove chlorine gas from the system and to reduce the ferric chloride to non-volatile ferrous chloride. The amount of finely divided zirconium required is only that amount necessary to effect these results; for example, only a trace amount is required to hold back the iron impurities. In many instances the amount of the finely divided zirconium metal ranges from about 0.5 to about 1.5 weight percent, based on the weight of the crude zirconium tetrahalide feed. The state of sub-division of the zirconium metal is important only in providing enough surface area to react with the contaminants.

In general, the salt mixture employed for the purpose of this invention must be selected to form low-melting molten mixtures, which may be eutectic mixtures. The salt mixtures useful in this invention will comprise the crude impure zirconium halide and at least one alkali metal halide. Using the zirconium tetrachloride system as an example, the salt mixture may comprise sodium chloride, potassium chloride, or mixtures of these two alkali metal chlorides with the crude zirconium tetrachloride. The system $ZrCl_4$—$KCl$—$NaCl$ is preferred. Zirconium tetrachloride is continuously added along with finely divided zirconium metal to the melter at a rate which will maintain a low melting composition, which is held at a temperature above its melting point but below its boiling point. Sufficient zirconium tetrahalide must be continuously added to the melter to make up for the zirconium tetrahalide vapor removed from the vaporizer and for the zirconium tetrahalide which is retained in the melt purge. When two or more alkali metal chlorides are used in forming the salt melt, the mol ratio of the two alkali metal chlorides, e.g., NaCl:KCl, may range from about 1:1 to 1:4. Although the relative percentages of the alkali metal chlorides and the impure zirconium tetrachloride in the salt melt may vary over a wide range, it is preferred that the alkali metal chloride constituent be present in an amount of about 10 to 30 weight percent, preferably about 10 to 20 weight percent, while the crude zirconium tetrachloride constitutes about 70 to 90 weight percent, preferably about 80 to 90 weight percent, these weight percentages being based on the total weight of the salt mixture. A preferred starting melt has been found to contain about 86.5 weight percent zirconium tetrachloride, 11.0 weight percent KCl, and 2.5 weight percent NaCl. It will be understood that alkaline earth metal halides such as barium, strontium, and magnesium chlorides may be employed in conjunction with the alkali metal halides in forming the salt melts useful for the purposes of the present invention.

A unique feature of the present invention is the use of separate melting and vaporizing zones. This arrangement of separate zones results in a purer product, since many impurities previously removed only with difficulty now are removed easily as vapors at the same time that the zirconium tetrahalide-alkali metal halides eutectic melt is being formed. Moreover, the use of separate zones has the further advantage of permitting the feed material to be added to the system at atmospheric pressure. Such contaminants as air, $Cl_2$, $CO_2$, CO, $SiCl_4$, $BCl_3$, HCl, $COCl_2$, are substantially removed during this step. By the time the melt is passed from the melter to the separate vaporizer, most of the insoluble gaseous impurities have already been removed and so the resulting vapor is essentially pure zirconium tetrahalide. The melt from which most of the zirconium tetrahalide has been vaporized retains non-volatile impurities, such as oxides and metal chlorides, either in suspension or as complex salts. The extent of the non-volatile impurity build-up in the melt system is controlled by purging sufficient melt from the return line from the vaporizing zone to the melting zone to maintain less than about a 17 weight percent water insoluble content, based on the total melt content. By holding the water-insoluble content of the melt to a maximum of 17 weight percent, the over-all impurity level is held at approximately 20 weight percent.

For illustrative purposes this invention will be described in its application to the purification of crude zirconium tetrachloride. It will be understood, however, that such a purification process is also applicable to hafnium tetrahalides and other halides of zirconium such as zirconium tetraiodide and zirconium tetrabromide. The crude zirconium halide utilized in the present invention may be derived from any known source. By crude zirconium halide is meant the zirconium halide which may be contaminated with gaseous impurities and one or more halides or other compounds of such metals as aluminum, cadmium, cobalt, chromium, iron, magnesium, manganese, molybdenum, nickel, lead, silicon, tin, titanium, vanadium, tungsten and so forth. For the purposes of this invention, hafnium which is usually associated with zirconium in nature is not considered a deleterious impurity when present in the zirconium tetrahalide.

The temperature in the scraped wall condenser ranges from about 90° to 160° F., and is preferably held at about 100° to 130° F. The temperature in the melter is maintained at a range of about 550° to 650° F., preferably about 600° to 625° F., while the temperature in the vaporizer is held at least as high as that at which zirconium tetrachloride vaporizes at the pressure in the vaporizer.

The invention will be further understood by reference to the following example.

EXAMPLE

Utilizing the apparatus shown in the accompanying drawing crude zirconium tetrachloride, having the composition shown in the following table, was continuously fed with NaCl and KCl in the ratio 86.5 lbs. $ZrCl_4$, 11.06 lbs. KCl and 2.5 lbs. NaCl along with finely divided zirconium metal (−20 mesh) to melter 14. The resulting mixture was heated to a temperature of about 615° F., which was maintained during the operation. The molten salt mixture which was formed was continuously stirred with agitator 16 operated at 200 r.p.m. During the heating, gaseous impurities were vented from the melter via line 18, while a portion of the molten salt mixture was continuously pumped via line 19 to vaporizer 20, where the melt was maintained at a temperature of about 750° F. Zirconium tetrachloride was continuously vaporized from the vaporizer 20 and removed overhead via line 21 and condensed (not shown). From the bottom of the vaporizer the depleted molten salt mixture was continuously recycled to the melter where it was mixed with additional crude zirconium tetrachloride to form the desired low melting mixture. The addition of crude zirconium tetrachloride feed and depleted salt mixture to the melter was maintained at a continuous rate along with the continuous pumping of the molten salt mixture to the vaporizer. A representative analysis of the zirconium tetrachloride recovered from the vaporizer is set forth below:

Table

| Element | Commercial Crude, p.p.m. | Purified $ZrCl_4$, p.p.m. |
|---|---|---|
| Al | 500 | <30 |
| B | 0.35 | <0.2 |
| Cd | 0.5 | <0.2 |
| Co | 5 | <5 |
| Cr | 40 | <20 |
| Fe | 750 | <200 |
| Mg | 233 | <20 |
| Mn | 30 | <10 |
| Mo | 20 | <20 |
| Ni | 40 | <20 |
| Pb | 10 | <20 |
| Si | 300 | <30 |
| Sn | 20 | <20 |
| Ti | 140 | <20 |
| V | 10 | <20 |
| W | 20 | <20 |

While particular embodiments of this invention are shown above, it will be understood that the invention is obviously subject to variance and modification without departing from its broader aspects. For example, the apparatus employed for carrying out the above-described purification system may be maintained under a controlled inert atmosphere, using such gases as argon or helium. It will be understood that other modifications may be employed within the scope of the foregoing description of the invention and the following claims.

What is claimed is:

1. A method for purifying an impure metal tetrahalide selected from the group consisting of zirconium tetrahalide, hafnium tetrahalide, and mixtures thereof which comprises the following sequential steps
   (1) forming in a melter a molten mixture comprising about 70 to 90 weight percent of said impure metal tetrahalide and about 10 to 30 weight percent of at least one alkali metal halide,
   (2) heating said molten mixture in said melter to a temperature within the range of about 550° to 650° F. to remove gaseous impurities therefrom and separating the gaseous impurities from said molten mixture, said molten mixture containing a minor amount of finely divided metal selected from the group consisting of zirconium and hafnium,
   (3) passing the thus treated molten mixture from said melter to a separate and distinct vaporizer,
   (4) heating the thus treated molten mixture at a temperature at least as high as that at which the metal tetrahalide is vaporized therefrom,
   (5) recovering said evolved purified metal tetrahalide,
   (6) recycling the molten mixture from which said metal tetrahalide has been vaporized from said vaporizer back to said melter, and
   (7) adding to said molten mixture in said melter impure metal tetrahalide at substantially the same rate at which the purified metal tetrahalide is being recovered.

2. The method of claim 1 wherein a portion of the melt is continuously removed from the recycle line between the vaporizer and the melter in an amount whereby the non-volatile impurity in the recycled molten mixture is maintained below about 17 weight percent.

3. The method of claim 1 wherein said molten mixture comprises zirconium tetrahalide, sodium halide, and potassium halide and a minor amount of finely divided metal selected from the group consisting of zirconium and hafnium.

4. The method of claim 3 wherein said zirconium and alkali metal halides are chlorides.

5. The method of claim 1 wherein said finely divided metal is zirconium.

6. The method of claim 1 wherein said molten mixture comprises hafnium tetrahalide, sodium halide, and potassium halide, said molten mixture containing a minor amount of finely divided metal selected from the group consisting of zirconium and hafnium.

7. The method of claim 6 wherein said hafnium, sodium and potassium halides are chlorides.

8. The method of claim 6 wherein said finely divided metal is hafnium.

9. The method of claim 6 wherein the mol ratio of sodium halide and potassium halide is within the range of about 1:1 to 1:4.

References Cited in the file of this patent

UNITED STATES PATENTS

| | | |
|---|---|---|
| 2,443,253 | Kroll et al. | June 15, 1948 |
| 2,592,021 | Frey et al. | Apr. 8, 1952 |
| 2,744,060 | Eaton | May 1, 1956 |
| 2,836,547 | Stoddard et al. | May 27, 1958 |
| 2,845,341 | Marshall et al. | July 29, 1958 |
| 2,916,350 | Newnham | Dec. 8, 1959 |
| 2,916,362 | Horrigan et al. | Dec. 8, 1959 |
| 2,962,352 | Schott et al. | Nov. 29, 1960 |

OTHER REFERENCES

Horrigan: "Journal of Metals," pages 1118–1120 (October 1955).